United States Patent
Mooij et al.

[11] Patent Number: 5,861,091
[45] Date of Patent: Jan. 19, 1999

[54] PROCESS FOR ELECTROCHEMICALLY DISSOLVING A METAL SUCH AS ZINC OR TIN

[75] Inventors: Joop Nicolaas Mooij, Castricum; Jacques Hubert Olga Joseph Wijenberg, Utrecht, both of Netherlands

[73] Assignee: Hoogovens Staal BV, Ca Ijmuiden, Netherlands

[21] Appl. No.: 765,687

[22] PCT Filed: Jul. 19, 1995

[86] PCT No.: PCT/EP95/02838

§ 371 Date: Mar. 17, 1997

§ 102(e) Date: Mar. 17, 1997

[87] PCT Pub. No.: WO96/02689

PCT Pub. Date: Feb. 1, 1996

[30] Foreign Application Priority Data

Jul. 19, 1994 [EP] European Pat. Off. ............. 94202103

[51] Int. Cl.⁶ ...................................................... C25F 5/00
[52] U.S. Cl. ........................... 205/706; 205/707; 205/745; 205/771
[58] Field of Search .................................... 205/706, 707, 205/771, 745

[56] References Cited

U.S. PATENT DOCUMENTS

| | | | |
|---|---|---|---|
| 1,511,967 | 10/1924 | Holland | 205/706 |
| 4,280,887 | 7/1981 | Konstrantouros | 205/745 |
| 5,302,260 | 4/1994 | LeRoy et al. | |

FOREIGN PATENT DOCUMENTS 0479326  4/1992  European Pat. Off. .

*Primary Examiner*—Arun S. Phasge
*Attorney, Agent, or Firm*—Stevens, Davis, Miller & Mosher, L.L.P.

[57] ABSTRACT

An improved electrochemical dissolution process for electrochemically dissolving a first metal by simultaneously creating hydrogen evolution at a second metal. The second metal is a metal that has a larger current exchange density for hydrogen evolution than the first metal, and both metals are immersed in an aqueous electrolyte system, wherein the first metal and the second metal are galvanically coupled. By taking measures to reduce inhibition of the hydrogen evolution at the second metal, the rate of dissolution of the first metal is enhanced. The measures to reduce the inhibition comprise selecting suitable temperatures and concentrations of the electrolyte, dividing the electrolyte into two fluids coupled by a selectively permeable device and selecting suitable resistance value for a connecting means electrically connecting the first and the second metal. The invention is particularly useful for removing Zn or Sn from Zn- or Sn-containing steel scrap.

26 Claims, 9 Drawing Sheets

PROCESS FOR ELECTROCHEMICALLY DISSOLVING A METAL SUCH AS ZINC OR TIN

TECHNICAL FIELD

The invention relates to a method for electrochemically dissolving a first metal such as Zn or Sn by simultaneously creating hydrogen evolution at a second metal, and to a use of such a method for treating scrap and to an improved method of dezincing steel scrap.

BACKGROUND ART

Examples of industrial applications for dissolution of a metal, such as Zn or Sn in an aqueous electrolyte are the preparing of a solution containing ions of zinc or tin for electroplating purposes or dezincing or detinning of metal scrap, especially of steel scrap.

For preparing or replenishing a solution for plating purposes a metal may be fed to the aqueous electrolyte in a substantially pure form and no selective dissolution with respect to other metals may be needed. For removing the metal from e.g. steel scrap selective dissolution is desired, selective in that only the metal(s) to be dissolved dissolve, in order to be able to separate the metal from the scrap thus obtaining the separate metal and steel scrap substantially free of that metal.

As Sn and Zn may be applied as a covering layer on steel by electroplating from an electrolyte and the resulting steel is to be recycled, both above-mentioned dissolution applications are particularly relevant for steel production and recycling. Tinned steel is a widely used packaging material and galvanized steel is used in numerous product applications for example in automotive applications. In an electrochemical process for selective dissolution of Zn and Sn these metals and also Pb and Al may be separated from steel scrap, thus providing for recovery of such metals as well as clean steel scrap that can be reused in the manufacturing of steel.

The need for high efficiency removal of especially Zn from steel scrap has increased lately because the production of galvanized steel has increased enormously in the last 20 years, particularly in the building industry and in the automotive industry as well as for donestic appliances. In the life cycle sooner or later such Zn-containing steel will form scrap which is to be reprocessed in a steel making process for which only a limited Zn content of the scrap is allowed or desired.

In a known process for dissolving metals in an aqueous electrolyte for preparing a solution for plating purposes electrical power is fed to the electrolytical process in order to obtain an acceptable dissolution rate. In order to obviate electrodeposition of the metal being dissolved in the aqueous electrolyte on the cathode, a membrane may be installed separating the anolyte and the catholyte.

In dezincing or detinning metal scrap which takes place in an alkaline electrolyte for selectivity, dissolution is e.g. carried out without electrical power supplied making use of intrinsic galvanic coupling between different metals in the scrap in which case dissolution rates are very low, or electrical power is supplied from an external source such as a rectifier to the process.

U.S. Pat. No. 5,302,260 discloses a method of removing zinc from ganvalized steel without substantial co-dissolution of substrate iron comprising immersing the ganvalized steel in a caustic electrolyte solution anid electrically connecting the ganvalized steel to a cathode material which is stable in the caustic electrolyte and has a low hydrogen voltage.

EP 0 479 326 discloses alkaline leaching for dezincing of ganvalized steel scrap wherein the leaching solution includes an oxidant.

DISCLOSURE OF THE INVENTION

It is the object of the invention to improve the efficiency of the dissolution process by reducing the consumption of energy or materials and/or obviating the need to install electrical power and apparatuses for direct current supply.

This object is accomplished by employing the method according to claim 1.

In the present invention a galvanic process is used, i.e. a process wherein the first and the second metal are coupled without any external electrical power being fed to the process. It is remarked that a galvanic process per se is known, and is known to have the disadvantage that the dissolution rate almost immediately after immersion falls to a very low level, viz, as soon as the concentration of the first metal in the aqueous electrolyte begins to rise.

According to the invention in a method using such a galvanic process new and inventive measures can be taken to promote the evolution or hydrogen at the second metal thereby enhancing the dissolution rate of the first metal, which measures turn out to be of a quite simple nature.

In a preferred embodiment the aqueous electrolyte is an alkaline solution. Herewith the advantage is obtained that in the case of processing steel scrap the steel base is passivatedr in other words is not being dissolved. Also the equipment parts can be made using steel.

It is preferred that the alkaline solution has an alkalinity of more than 8M, preferably more than 9M. The dissolution rate rapidly increases for hydroxide concentrations above said values. This rapid increase is unexpected because in the region of hydroxide concentrations up to 7–8M the dissolution rate increases disproportionally with a decreasing slope.

It is preferred that the alkaline solution is held at a temperature of above 340 K, preferably above 350 K. Above this temperature the dissolution rate substantially increases.

Further it is preferred that mechanical abrasion is carried out or the surface of the second metal. This also promotes the hydrogen evolution.

Also the hydrogen evolution is promoted if powder of a second metal is added to the aqueous electrolyte surrounding the second metal agitating the aqueous solution containing the powder.

In an embodiment where the first metal is in the form of separate elements the first and the second metal are coupled by a current collector contacting the first metal. The current collector then electrically connects the first and the second metal. Such a current collector may be a metal casing containing the electrolyte.

An active surface of Mg is advantageous if it is desired that no hydrogen evolution occurs as a consequence of the presence of the current collector, since under these conditions at Mg no hydrogen evolution occurs.

In a very interesting embodiment of the method according to the invention the first and the second metal are galvanically coupled by connecting means said connecting means providing an electrical resistance which is selected such that the current flow through said connecting means is substantially at the maximum value obtainable by varying the resistance. Surprisingly an optimum resistance value not necessarily being the minimum resistance of the connecting means can be selected for maximum current flow through said connecting means, which maximum current flow corresponds to the maximum dissolution rate obtainable. If the resistance is lowered from infinity to zero, the current flow through the resistance firstly expectedly rises. However, surprisingly if the resistance is lowered below a specific resistance value, the current flow unexpectedly drops. According to the invention an optimum resistance value can be selected for maximum current flow and thus for maximum dissolution rate.

In a particular embodiment the electrical circuit comprising the connecting means is periodically interrupted. In cases where the inhibition of hydrogen evolution develops at a lower speed than it subsides upon interruption of the circuit, by suitably switching on and off the galvanic process a higher integral yield can be effected in time.

In a most preferred embodiment the aqueous electrolyte is divided into a first fluid-contacting the first metal and a second fluid contacting the second metal said first and second fluids being coupled by a selectively permeable device hindering passage of ions of the first metal to the second fluid.

This measure results in a remarkable increase of the dissolution rate.

The invention is advantageously used in removing a coating from a metal substrate, e.g. Zn or Sn from metal scrap, preferably steel scrap.

According to the invention a known apparatus having first and second process volumes coupled by a device capable of hindering the passage of ions can advantageously be used for galvanic dissolution of Zn or Sn.

The invention is also embodied in a method for treating Zn-containing steel scrap by electrochemically dezincing in an alkaline solution in a first process and reclaiming the zinc in a second process characterized in that the dezincing in the first process takes place galvanically, i.e. without external electrical power supply. In such a method considerable savings are achieved in that the dezincing takes place without external electrical power supply.

It is believed that in a galvanic process, inhibition of the hydrogen evolution reaction (HER) is caused by the occurrence of a phenomenon that may be called under potential deposition (UPD), which means that in a method according to the preamble of claim 1, although the first metal will not form a massive deposit on the second metal, it tends to form a (sub-)monolayer at the surface of the second metal, which apparently hinders evolution of hydrogen.

Since the dissolution rate and the hydrogen evolution correspond, by reducing the inhibition of the hydrogen evolution at the second metal, according to the invention the dissolution of the first metal can be promoted.

BRIEF DESCRIPTION OF DRAWINGS

Reference is made to the drawings wherein.

Wherein all potentials referred to are measured against a Ag/AgCl, KCl(saturated) reference electrode, which has a potential of 0.197 V vs. NHE (Normal Hydrogen Electrode).

The invention will now be demonstrated by way of non-limitative examples comprising results of experiments.

For spontaneous dissolution of a first metal, being denoted $M_1$ for convenience, in an aqueous electrolyte to occur, some requirements will have to be fulfilled, which are outlined below.

First of all, the first metal $M_1$ should act as an anode:

$$M_1 \rightarrow M_1^{a+} + ne$$

wherein n is the number of electrons per atom oxidized. Electrons, being released as a result of the anodic reaction, are readily consumed in a corresponding cathodic reaction. The cathodic reaction in the underlying invention is the hydrogen evolution reaction (HER):

$nH^+ + ne \rightarrow \frac{1}{2}nH_2(g)$ (acid solution)

$nH_2O + ne \rightarrow \frac{1}{2}nH_2(g) + nOH^-$ (alkaline solution)

So, both reactions proceed hand in hand. In case of spontaneous dissolution, the reversible (open circuit) cell potential $E_{cell}$, which is defined as the cathodic potential $E_c$ minus the anodic potential $E_a$, should be positive. This case is generally being referred to as a galvanic cell in contrast to an electrolytic cell. In case of an electrolytic cell $E_{cell} < 0$, a potential difference has to be applied, with the help of an external device, like a rectifier, to enforce the electrode reactions to proceed in a direction opposite to their spontaneous tendencies. The invention is related to galvanic cells, so $E_{cell} > 0$. This condition holds for both Zn and Sn and more generally for all metals ranking negative in the electrochemical series, in both an acid and an alkaline environment. These metals will spontaneously dissolve, whereby simultaneously the HER will take place at their surface. However, the latter reaction proceeds very slowly at both a Zn and a Sn surface. Consequently, the HER determines the rate of the overall reaction. In electrochemical terms the rate of a particular electrode reaction is being expressed by its exchange current density (symbol:$i_0$). A 'slow' electrode is being characterized by a low $i_0$ ($H_2O \rightarrow H_2$). The HER at a Zn surface has an exchange current density in the order of $10^{-10.5}$ A cm$^{-2}$. The dissolution rate of $M_1$ can be increased signrificantly by galvanic coupling of $M_1$ a second metal $M_2$, having a larger exchange current density for the HER than $M_1$, like Pt, Pd, Ir, Co, Ni and Fe or steel, in the case of $M_1$ being Zn or Sn. In case of Fe, $i_0$ ($H_2O \rightarrow H_2$) $\approx 10^{-5.5}$ A cm$^{-2}$.

Figure 1:
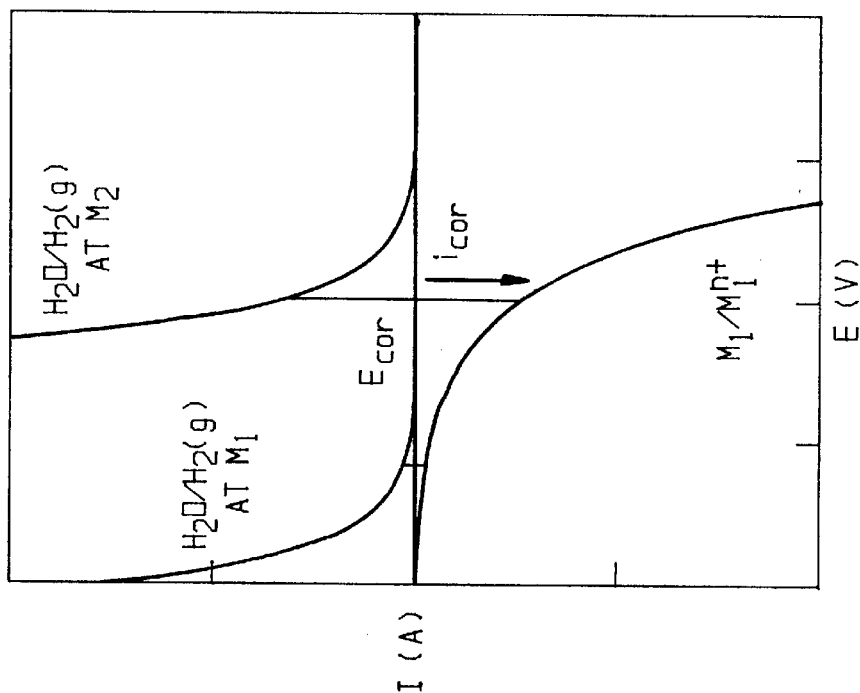
FIG. 1 represents the dissolution rate of a first metal, both in case the first metal is isolated and in case it is coupled to a second metal, which has a larger exchange current density for the HER than the first metal.

The effect of galvanic coupling of $M_1$ to a foreign metallic substrate $M_2$ is depicted in FIG. 1. If $M_1$ is immersed into an aqueous solution, it will adopt a mixed potential, called the corrosion potential, at which the anodic current equals the cathodic current, which current is called the corrosion current, but, because corrosion implies an unwanted deterioration of a metal, here this current will be referred to as the dissolution current. In the case of $M_1$ coupled to $M_2$, the mixed potential is shifted in a positive direction, resulting in a larger dissolution current.

In order to study the effect of galvanic coupling on the dissolution rate, experiments were carried out on one-sided galvanized steel, in which case galvanic coupling is intrinsic. As a reference material, also two-sided galvanized steel and pure Zn have been used in some experiments. Coupons of 6.5×5.5 cm² were prepared and exposed to NaOH solutions. The dissolution rate was determined by weight-loss experiments. The time of exposure, amount of Zn dissolved, NaOH concentration and temperature were varied. All experiments were carried out at least in duplo. The spread in numerical results was marginal.

EXAMPLE 1

Figure 2:
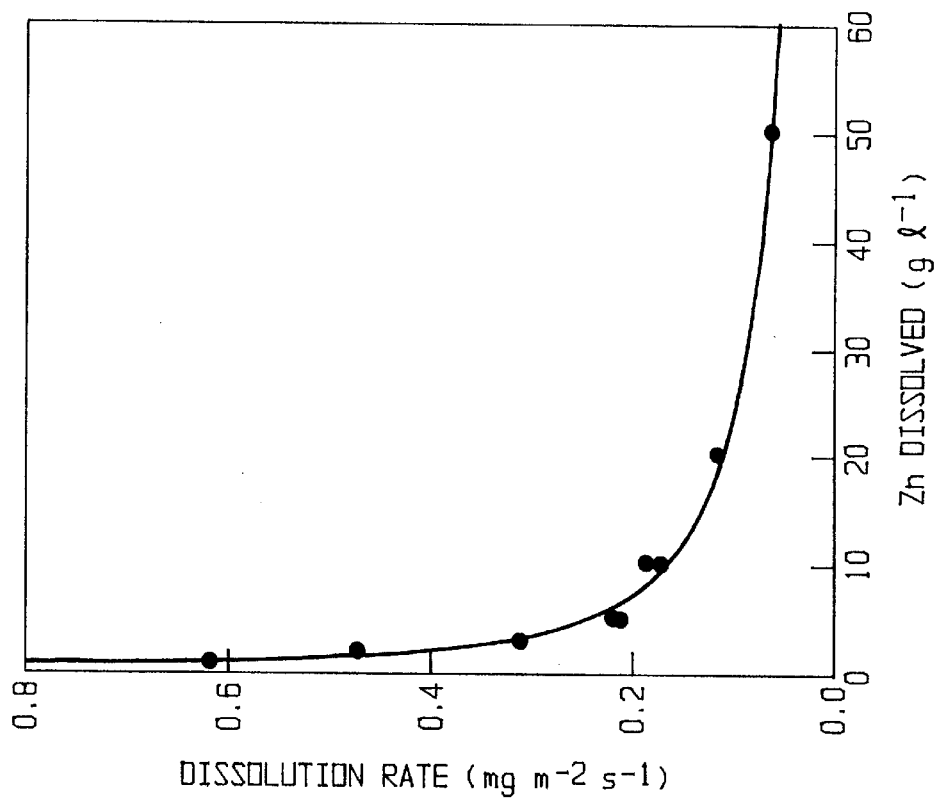
FIG. 2 represents the dissolution rate of Zn intrinsically coupled to steel as a function of Zn dissolved (7.5M NaOH, 298 K)

Coupons of one-sided galvanized steel were exposed to a 7.5M NaOH solution at 298 K with a different amount of Zn dissolved. As is seen in FIG. 2, the dissolution rate of Zn is slowed down drastically once a small amount of Zn is dissolved. This effect is very much larger than expected from calculations. These calculations revealed that this effect can not be explained by assuming Butler-Volmer kinetics, correcting for the shift in the reversible potential of the $Zn(OH)_4^{2-}/Zn$ redox couple, which was commuted with the Nernst equation.

EXAMPLE 2

Figure 4:
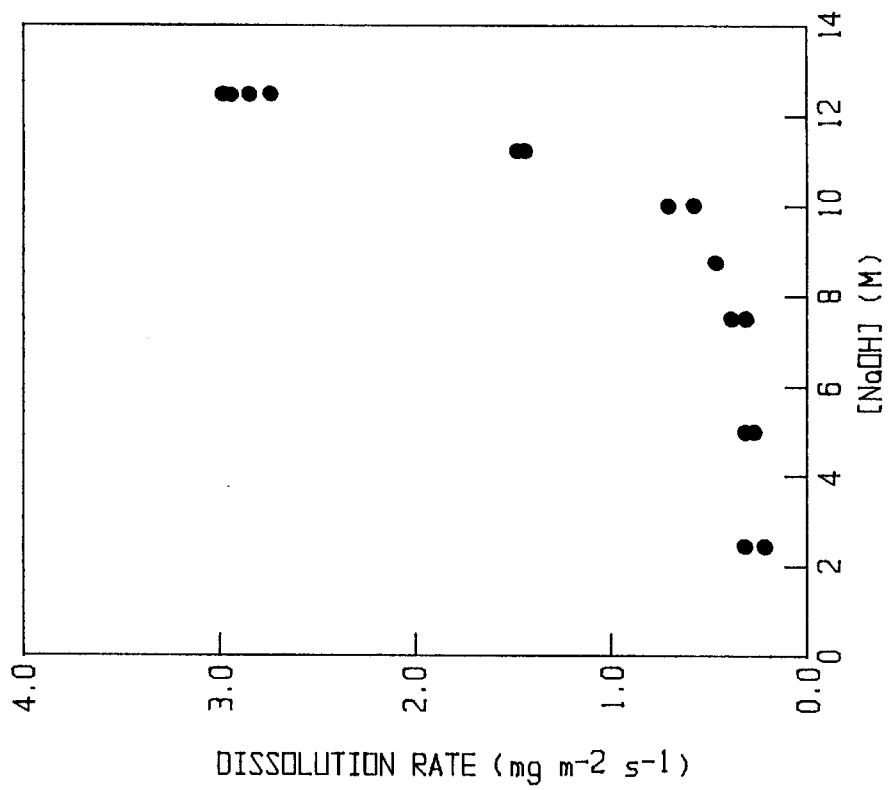
FIG. 4 represents the dissolution rate of Zn intrinsically coupled to steel as a function of NaOH concentration (2 g l$^{-1}$ Zn dissolved, 298 K)
Figure 3:
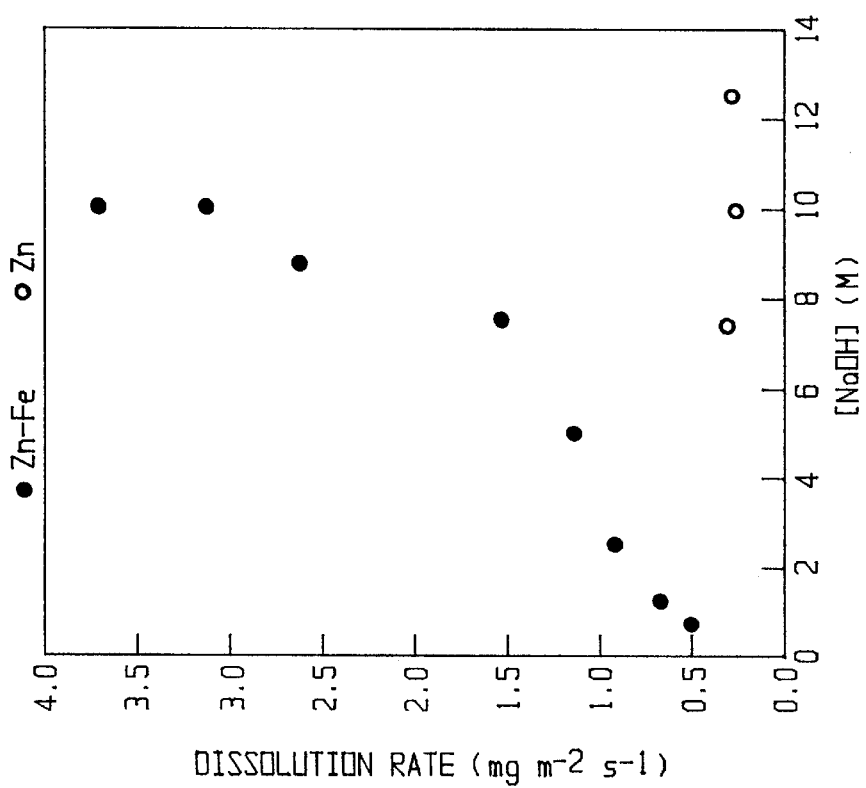
FIG. 3 represents the dissolution rate of Zn, both isolated and intrinsically coupled to steel, as a function of NaOH concentration (2 g l$^{-1}$ Zn dissolved, 343 K)
Figure 5:
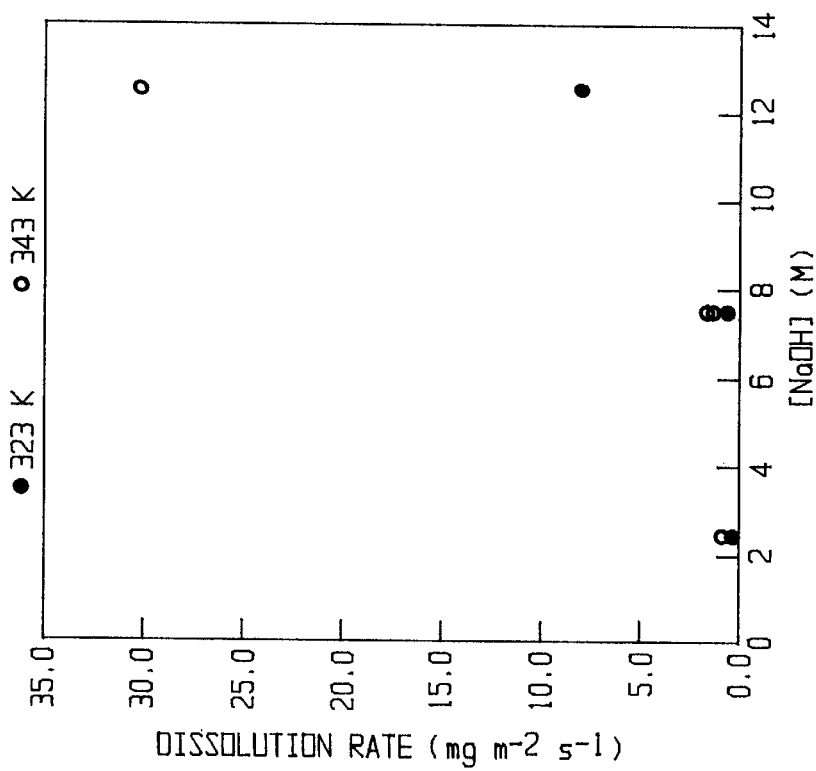
FIG. 5 represents the dissolution rate of Zn intrinsically coupled to steel as a function of NaOH concentration (2 g l$^{-1}$ Zn dissolved, 323 and 343 K)

In a further experiment coupons of one-sided and two-sided galvanized steel, as well as coupons of pure Zn, were exposed to NaOH solutions of different alkalinity. From FIG. 3, by comparing the experiments on two-sided galvanized steel, i.e. without coupling to steel, with the experiments on one-sided galvanized steel, i.e. coupling to steel being intrinsic, it is seen that the dissolution rate is increased considerably by galvanic coupling to steel. Also experiments were carried out on pure Zn, which results were similar to results obtained from experiments carried out on two-sided galvanized steel. Noteworthy is the inflection point at higher NaOH concentrations. Where the dissolution rate of Zn only slowly increases up to a concentration of about 8M, it suddenly unexpectedly increases sharply at higher concentrations. In case of two-sided galvanized steel, the dissolution rate is almost independent of the NaOH concentration. The remarkable increase in the dissolution rate or Zn at higher NaOH concentrations has been invariably reproduced under various experimental conditions (see FIGS. 4–5).

EXAMPLE 3

Figure 6:
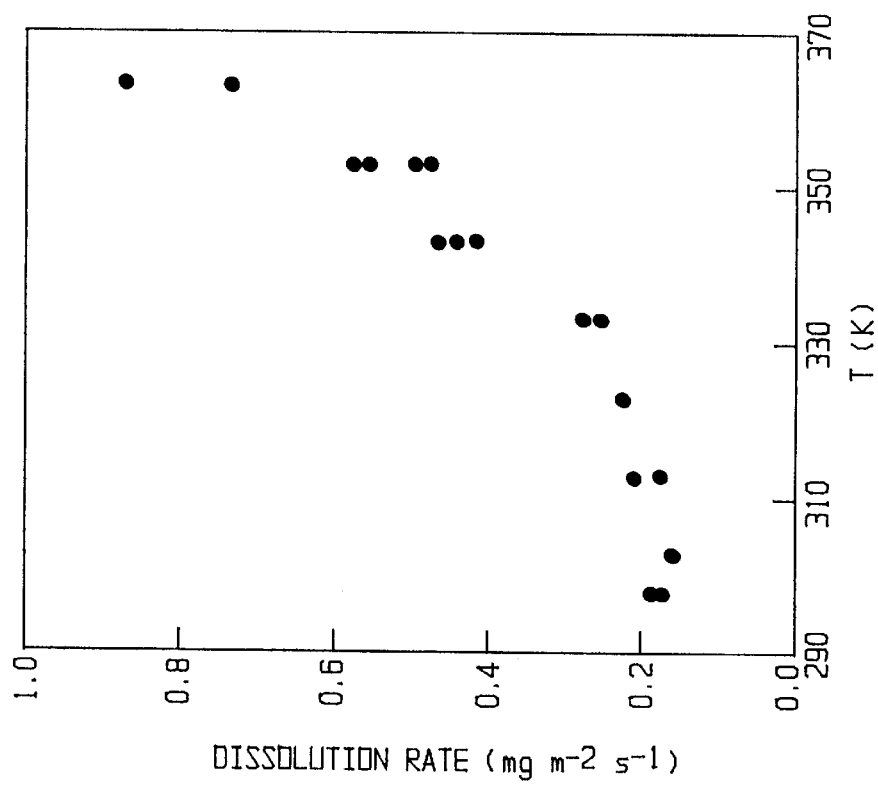
FIG. 6 represents the dissolution rate of Zn intrinsically coupled to steel as a function of temperature (7.5M NaOH, 10 g l$^{-1}$ Zn dissolved)
Figure 8:
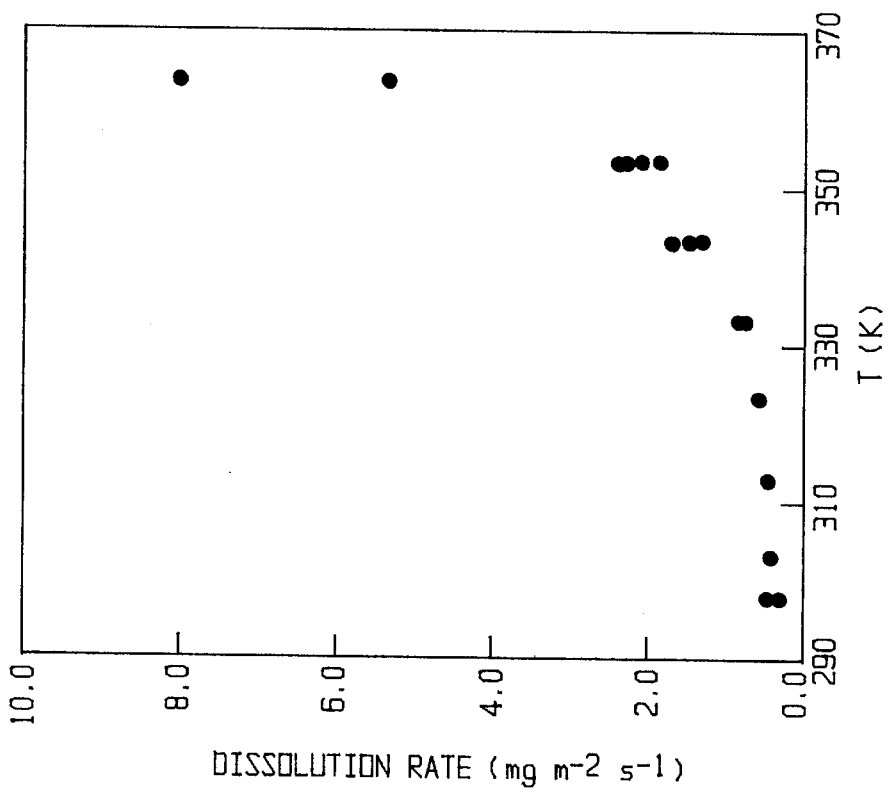
FIG. 8 represents the dissolution rate of Zn intrinsically coupled to steel as a function of temperature (7.5M NaOH, 2 g l$^{-1}$ Zn dissolved)
Figure 7:
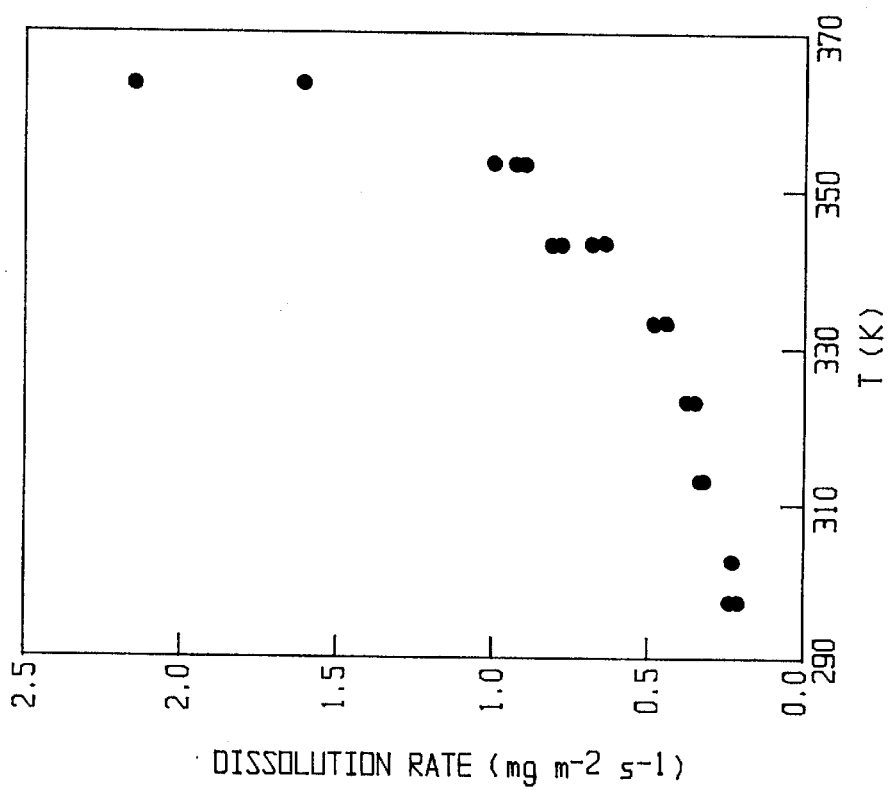
FIG. 7 represents the dissolution rate of Zn intrinsically coupled to steel as a function of temperature (2.5M NaOH, 2 g l$^{-1}$ Zn dissolved)

In a further experiment coupons of one-sided galvanized steel were exposed to NaOH solutions at different temperatures. From FIGS. 6–8 it is seen that the dissolution rate of Zn increases sharply at higher temperatures. Surprisingly, Arrhenius plots, ln(dissolution rate) vs. (1/T), gave no straight lines, but indicated that at higher temperatures the increase in the dissolution rate is very much larger than expected.

EXAMPLE 4

Figure 10:
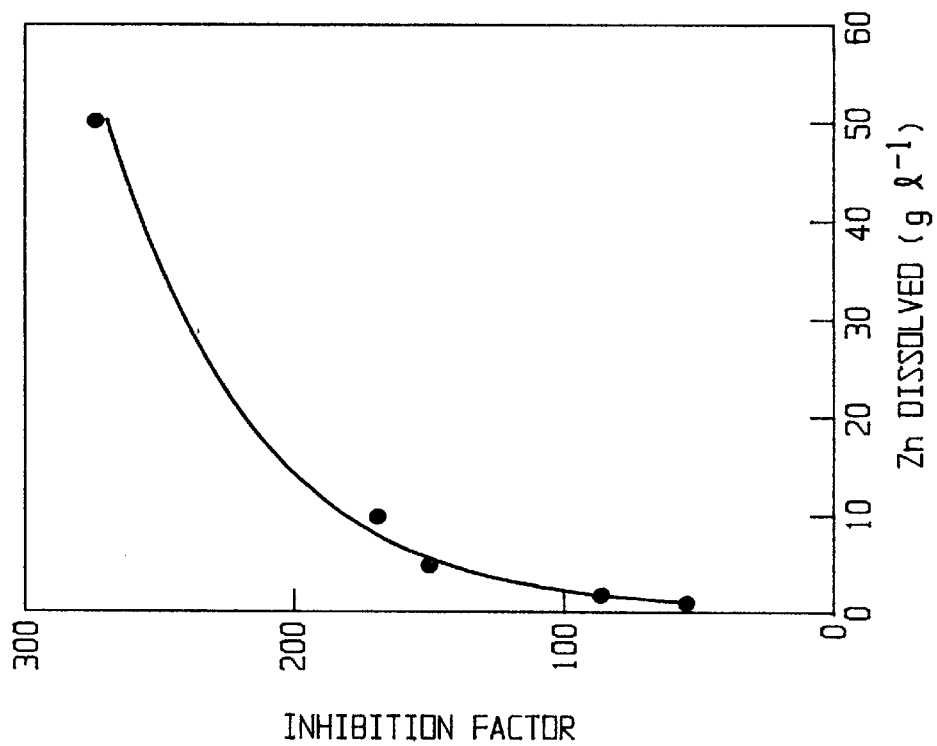
FIG. 10 represents the inhibition factor as a function of Zn dissolved (7.5M NaOH, 298 K)
Figure 9:
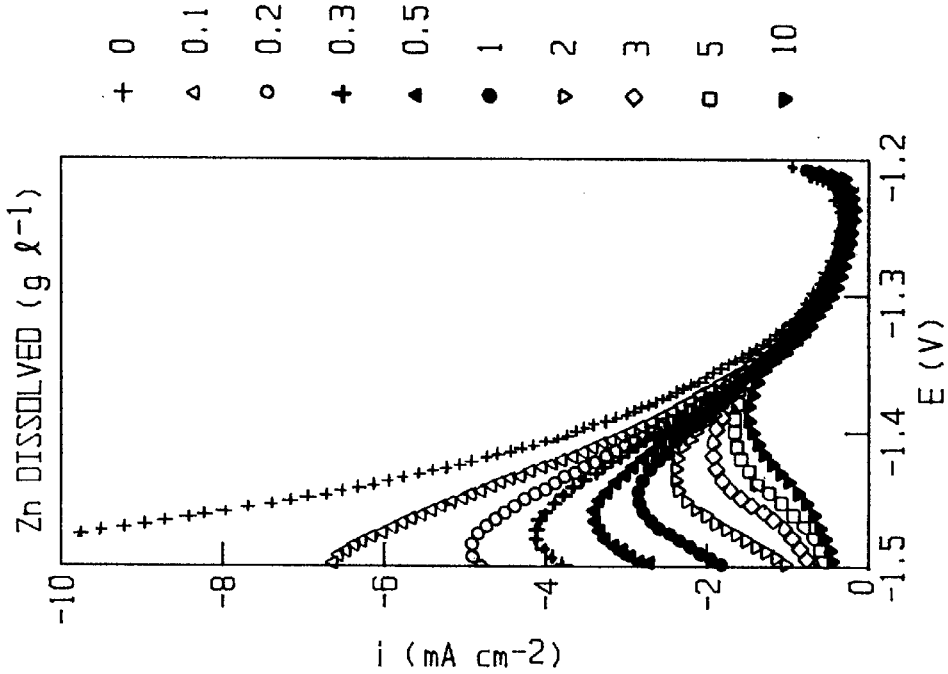
FIG. 9 represents linear sweep voltammograms (scan rate 1 mV s$^{-1}$) of a steel electrode (7.5M NaOH, 298 K, various amounts of Zn dissolved as indicated)
Figure 12:
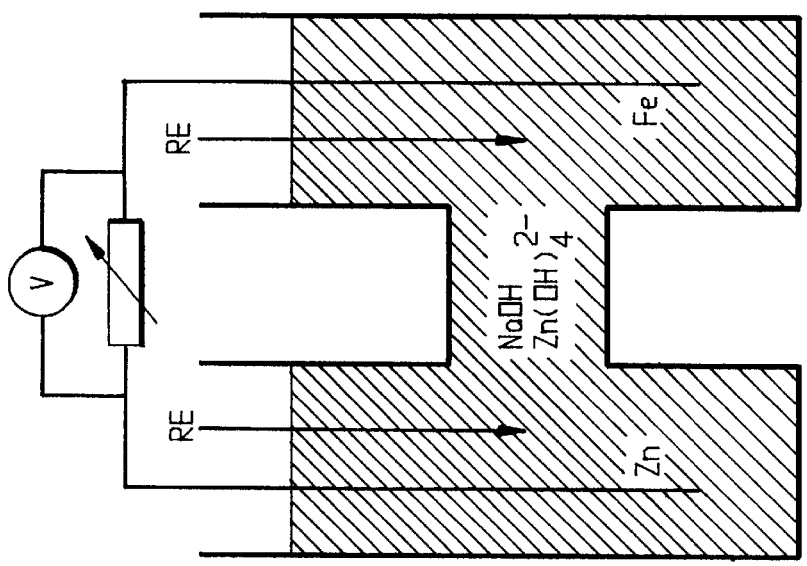
FIG. 12 represents a schematic presentation of a coupled current experiment without a barrier between the anodic and cathodic compartment; the resistor in the external circuit was varied as indicated; anodic compartment (7.5M NaOH, 5 g l$^{-1}$ Zn dissolved, 298 K); cathodic compartment same as anodic compartment.

In view of the experiments described above, the HER at a steel surface was studied in more detail, as this reaction, as already mentioned before, determines the dissolution rate. A steel electrode was immersed into NaOH solutions, together with a Pt counter electrode and a Ag/AgCl, KCl(saturated) reference electrode. using a potentiostat, it was possible to control the potential of the steel electrode with respect to the reference electrode. The potential of the steel electrode was varied linearly with time with a scan rate of 1 mV s$^{-1}$ in the negative direction and simultaneously the current was measured. In FIG. 9. linear sweep voltammograms are plotted at various amounts of Zn dissolved. Clearly, the presence of only a small amount of Zn dissolved, already slows down the HER at a steel surface drastically. Apparently a form of underpctential deposition (UPD) of Zn on steel occurs, whereby a (sub-)monolayer of Zn is deposited on steel. The extent to which the HER is inhibited has been evaluated experimentally at various concentrations of Zn dissolved (FIG. 10). 5 g l$^{-1}$ Zn dissolved inhibits the dissolution rate by a factor 150, at 298 K. Also, the coverage of the steel surface has been evaluated. coverage here means the extent to which the active surface of the second metal is covered with ions of the first metal. A logarithmic relationship was found between the $Zn(OH)_4^{2-}$ concentration and the coverage, which indicates that UPD of Zn on steel follows the Temkin adsorption isotherm.

EXAMPLE 5

Figure 11:
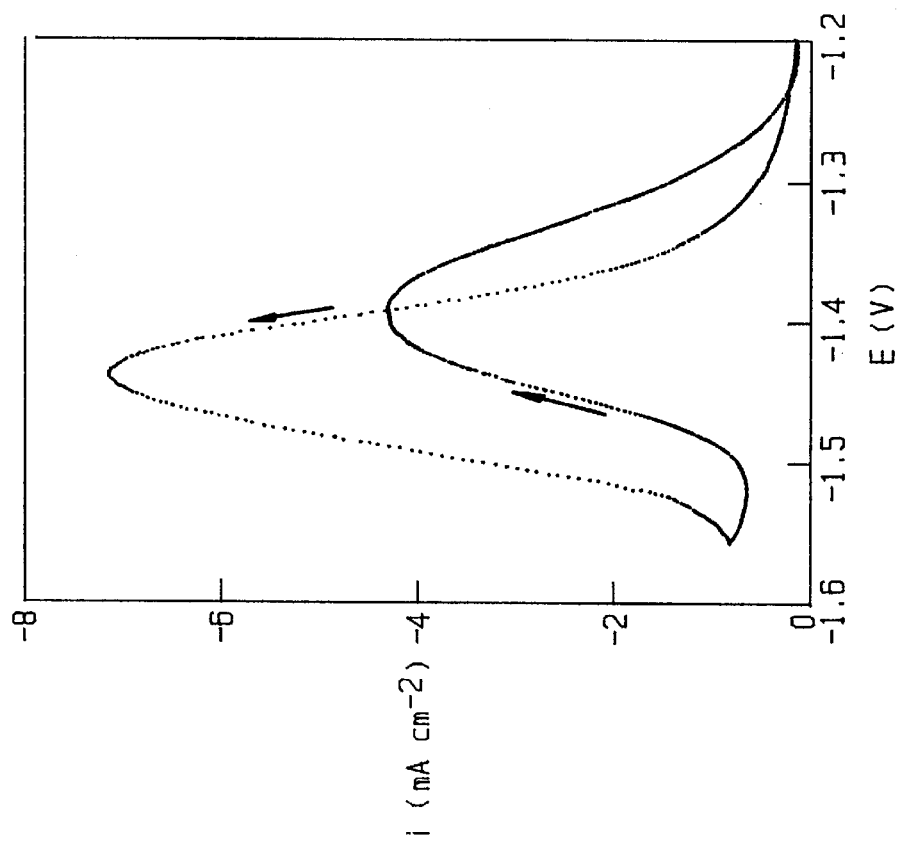
FIG. 11 represents a cyclic voltammogram (scan rate 1 mVs$^{-1}$) of a steel electrode (7.5M NaOH, 3 g l$^{-1}$ dissolved, 343 K)

In a further experiment, similar to example 4, but now the potential of the steel electrode was varied linearly with time (scan rate 1 mV s$^{-1}$), first in the negative direction, then backwards in the positive direction, and simultaneously the current was measured. FIG. 11 presents a so-called cyclic voltarmmogram in of a steel electrode in a solution of 7.5M NaCH with 3 g l$^{-1}$ Zn dissolved at a temperature of 343 K. The hysteresis between the forward and the backward scan proves that UPD takes some tine to develop completely. This is also confirmed by multiple potential step experiments, wherein the potential was suddenly switched from the reversible potential to a potential inside the UPD region, which invariably show that some time is needed for the current to become stationary. This opens the opportunity to diminish the effect of UPD by breaking the contact between a galvanic couple of Fe—Zn, before the (sub-)monolayer of Zn has had the chance to develop completely, Once the contact is broken, both metals will adopt to their reversible potential. So, the (sub-)monolayer of Zn will dissolve again. Then, the contact is restored, and so on.

EXAMPLE 6

In another experiment, coupled current measurements were carried out without and with a barrier, hindering transfer of $Zn(OH)_4^{2-}$ ions from the anodic to the cathodic compartment, but enabling passage of other ions than $Zn(OH)_4^{2-}$, in order to limit ohmic drop over the barrier as much as possible.

Figure 13:
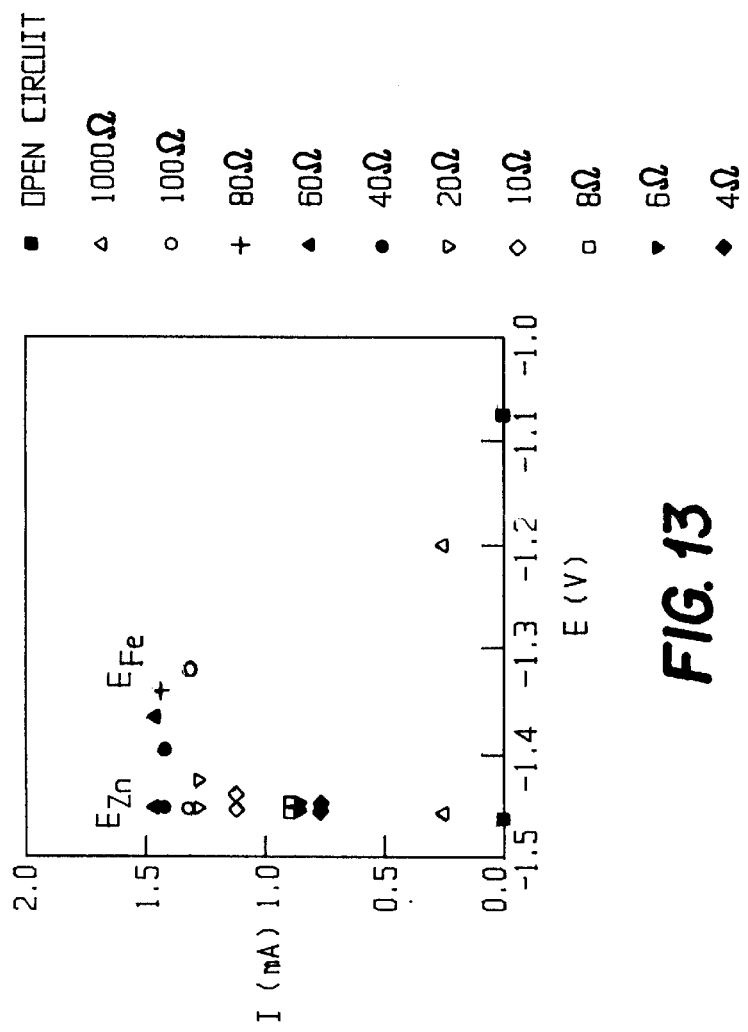
FIG. 13 represents the anodic current at $E_{zn}$ and the cathodic current at $E_{Fe}$ in case of the experimental set-up as depicted in FIG. 12.

Coupled current measurements without a barrier:

A Zn bar was immersed in the anodic compartment of a H-cell and a Fe bar was immersed in the cathodic compartment (see FIG. 13). The H-cell was filled with an aqueous electrolyte (2.5M NaOH, 5 g l$^{-1}$ Zn dissolved, 298 K). The bars were partly taped with electroplating tape, 3M® No. 484 in order to expose a well-defined area of 2 cm$^2$ to the solution. Between the bars a variable resistor was inserted, over which the potential difference was measured with a high input impedance multimeter. In both compartments a reference electrode was placed, so that the electrode potentials could be separately measured. The resistance was gradually reduced from R=∞ Ω (open circuit) to R=0 Ω (short circuit). The cell current was calculated from Ohm's law. It is seen from FIG. 13 that UPD of Zn manifests itself straightforwardly. Lowering the resistance, the potential of the Fe bar shifts from its reversible value (open circuit) to its mixed potential (short circuit). It is readily seen that the HER is inhibited drastically, inhibition being strongest at the mixed potential. Once the cell current has passed its maximum value and is decreasing, the Zn bar is being less polarised; its potential shifts back towards its reversible potential. Surprisingly, the maximum current has been reached for R=6 Ω. This Ohm's resistance should not be considered as the absolute value for which the maximum current is reached in all cases. The important conclusion is that maximum current is not necessarily achieved at minimum Ohm's resistance. rn other words, there are cases where the cell current may be increased by increasing the resistance in the circuit. In practice this means that the cell current may be maximized, by increasing, starting from the short circuit situation, the external resistance until the condition dI/dR=0 has been satisfied. Once dI/dR=0, $E_{Fe}$ will have attained a value, which will depend on the $Zn(OH)_4^{2-}$ concentration as can be seen from FIG. 9, and $E_{zn}$ will have attained its most positive value.

Figure 14:
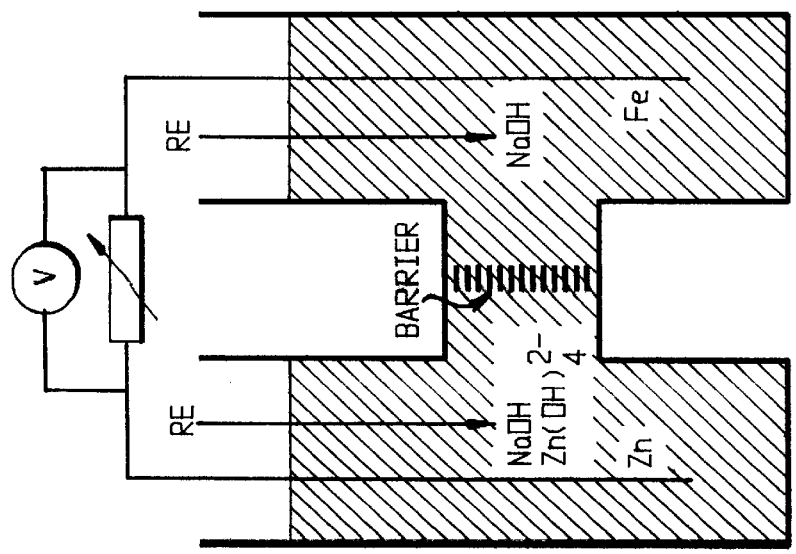
FIG. 14 represents a schematic presentation of a coupled current experiment with a barrier between the anodic and cathodic compartment; the resistor in the external circuit was varied as indicated; anodic compartment (7.5M NaOH, 5 g l$^{-1}$ Zn dissolved, 298 K); cathodic compartment (7.5M NaOH, 298 K)
Figure 15:
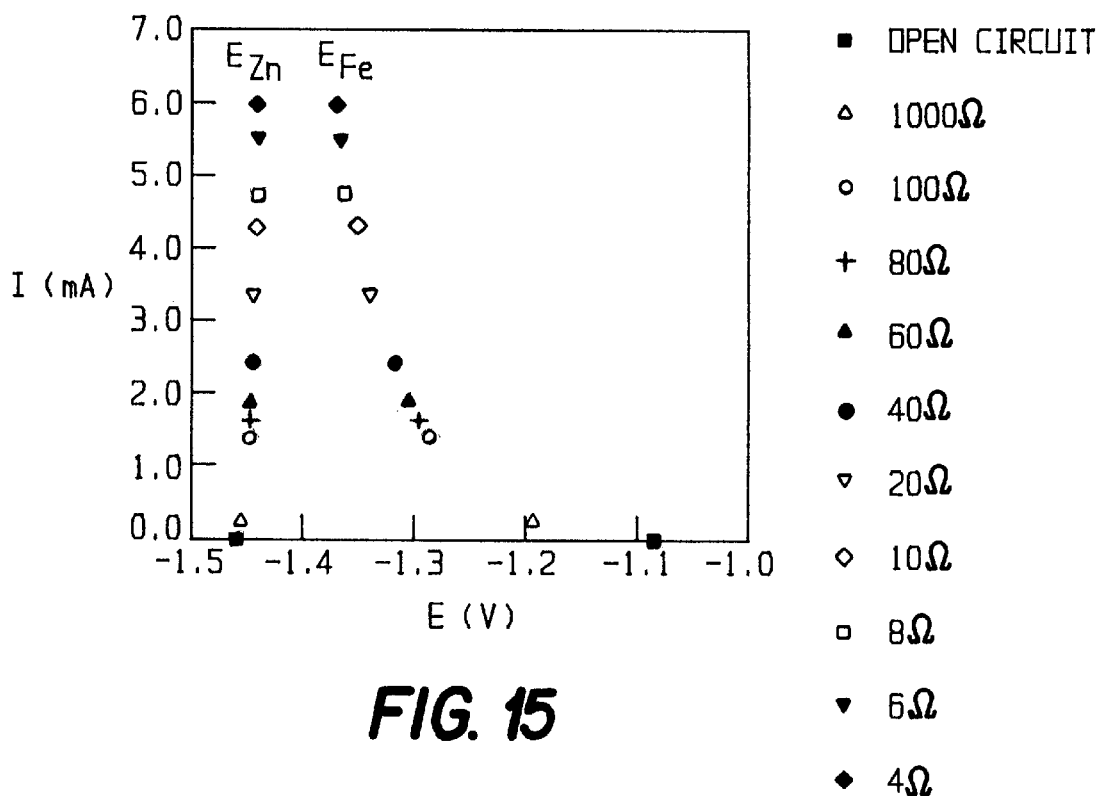
FIG. 15 represents the anodic current at $E_{zn}$ and the cathodic current at $E_{Fe}$ in case of the experimental set-up as depicted in FIG. 14.
Figure 16:
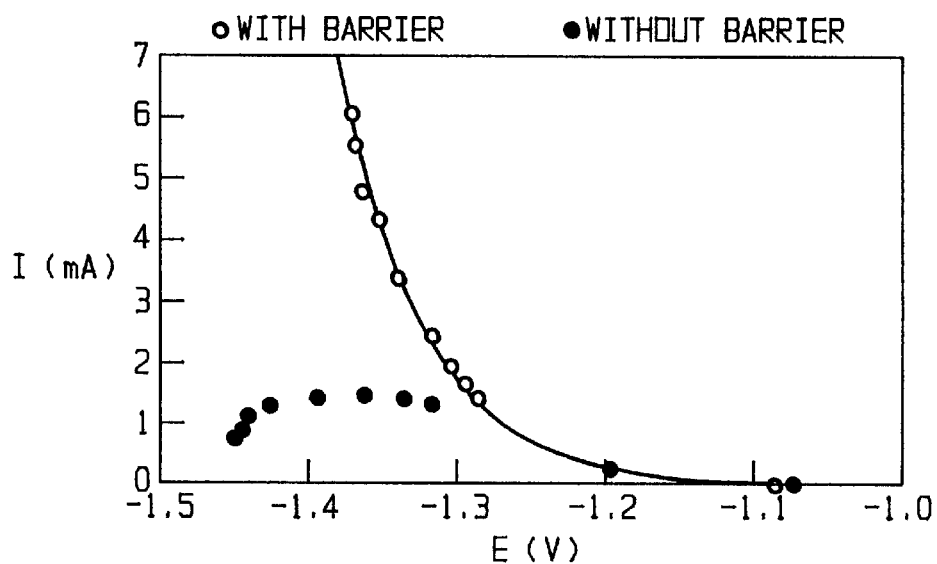
FIG. 16 represents the cathodic current as a function of $E_{Fe}$ for the coupled current experiments without and with a barrier between the anodic an cathodic compartmsent.
Figure 17:
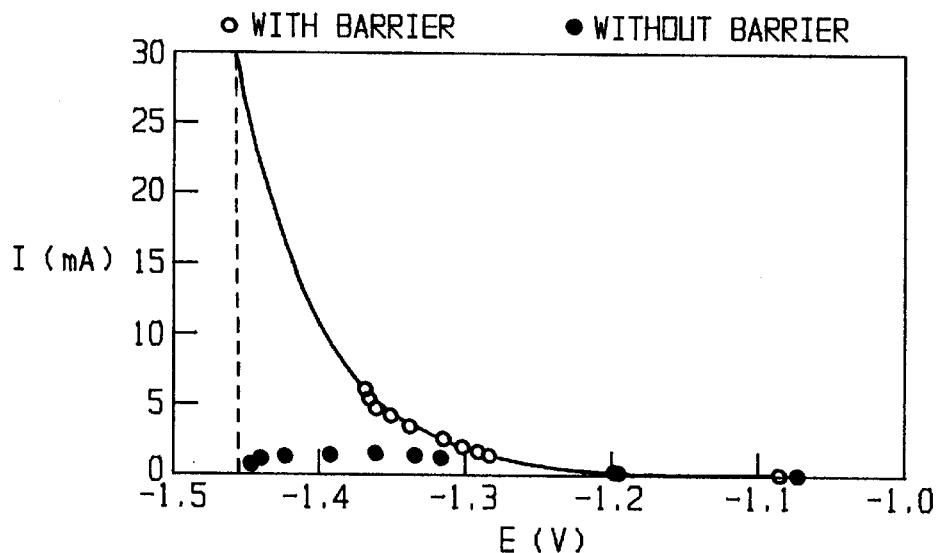
FIG. 17 same as FIG. 16, but now the cathodic current as a function of $E_{Fe}$ of the coupled current experiment with a barrier between the anodic and cathodic compartment has been extrapolated to tore negative potentials making use of the Butler-VoLmer equation.

Coupled current measurements with a barrier:

A barrier was inserted between both compartments (see FIG. 14). The compartments were filled with the same solution as in the previous experiment, but now the cathodic compartment did not contain any Zn dissolved. The potential difference between both reference electrodes represents the voltage drop over the barrier. From FIG. 15 it is seen that inhibition of the HER does not occur anymore, leading to larger cell currents. In the short circuit situation $E_{zn}$ is not equal anymore to $E_{Fe}$, which is caused by the voltage drop over the barrier, which had a resistance of about 12 Ω. The HER now satisfies the Butler-Volmer equation $i=10^{-5}\exp(-17.8(E-E_{eq}))$ A cm$^{-2}$, wherein $E_{eq}$ is the equilibrium potential, which is in good agreement with values from literature. By reducing the voltage drop over the barrier the cell current can be made much larger, because both anodic and cathodic current depend exponentially on potential. Suitable membranes are commercially available, e.g. a Nafion® membrane may be used. In FIG. 16, only the cathodic current is plotted vs. $E_{Fe}$, to compare both coupled current experiments. In FIG. 17, the cathodic current of the coupled current experiment with a barrier between the anodic and cathodic compartment has been extrapolated to more negative potentials of $E_{Fe}$, from which it becomes clear that larger currents will be reached as the voltage drop over the barrier is reduced.

EXAMPLE 7

Figure 18:
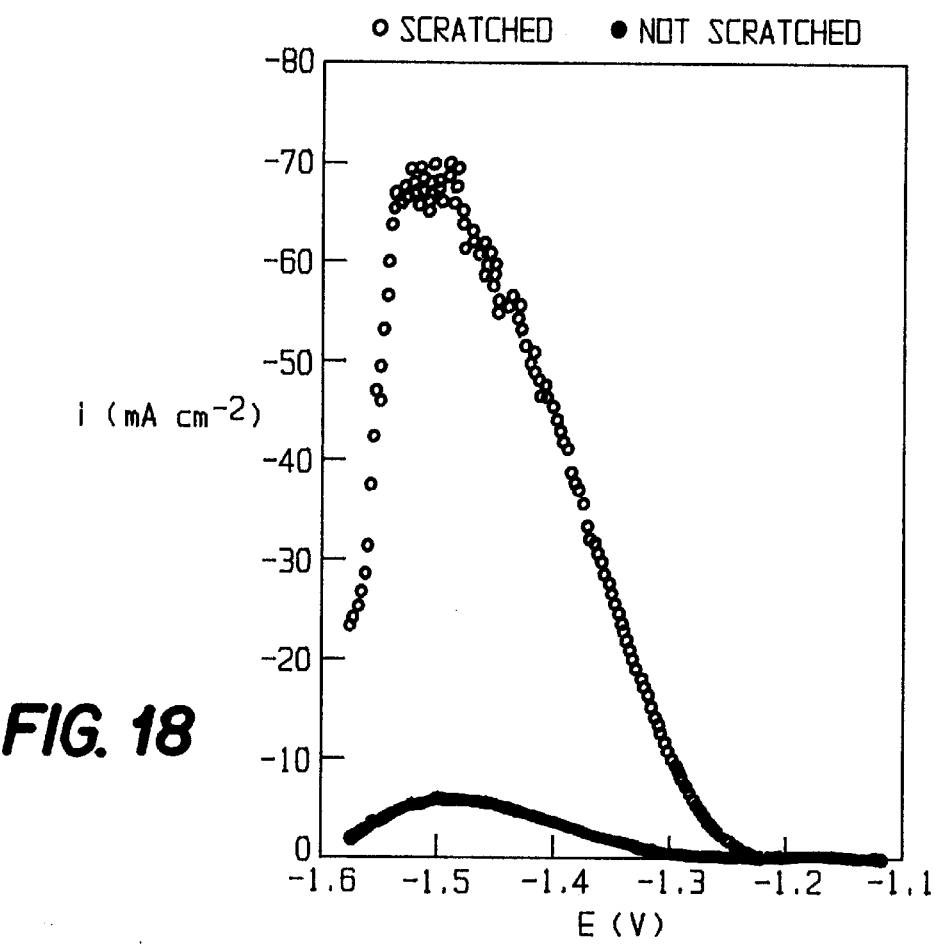
FIG. 18 represents the affect of scratching the surface of a steel electrode on the HER (7.5M NaOH, 3 g l$^{-1}$ dissolved, 343 K.

In a further experiment, the influence of a mechanical treatment of the second metal was studied. It is seen from FIG. 18 that scratching of a steel surface has a strong effect on the HER. This effect probably results from an increased activity of the surface with respect to the HER. Increasing the activity of the surface is advantageously combined with any of the other measures to promote dissolution, since a synergetic effect occurs under all circumstances.

EXAMPLE 8

In another experiment, fine iron powder was added to a beaker of 1 l containing a 2:5M NaOH solution with 5 g l$^{-1}$ Zn dissolved at 353 K. The solution was being stirred continuously. Six coupons of two-sided galvanized steel were exposed to the solution. The thickness of the Zn layer was 8 μm. Every 5 minutes one coupon was taken out and the effectiveness of dezincing was being evaluated. It appeared that the amount of iron powder had a strong affect on the dissolution rate of Zn. The time needed for complete dezincing was reduced from 24 minutes at an amount 50 g l$^{-1}$ iron powder to less than 5 minutes at an amount of 200 g l$^{-1}$, Adding more powder than 200 g l$^{-1}$ gave no further improvement.

EXAMPLE 9

In a further experiment it was observed that also Sn coupled to steel or Pt leads to acceptable dissolution rates. Because Sn is more noble than Zn ($E_{Sn}>E_{Zn}$), the dissolution rate of Sn coupled to $M_2$ was smaller than in the case of Zn coupled to $M_2$.

EXAMPLE 10

It was observed that if Mg is used as a current collector no HER occurs at the current collector's surface. The specific electrical resistance of Mg is somewhat larger than that of Cu, but still small enough to conduct considerable currents with negligible ohmic losses. these qualities make Mg an ideal current collector, if no hydrogen evolution is desired to occur at the current collector.

As follows from the above examples and experiments several measures can be taken to obtain favourable dissolution rates of metals such as Sn and Zn. As is shown steel scrap can be very economically dezinced or detinned by processing the scrap in a reservoir made of steel comprising two compartments separated by a membrane in order to prevent UPD in the cathodic compartment. Another possibility to largely prevent UPD is to add a metal powder of $M_2$, e.g. iron powder to the reservoir and stir the electrolyte. By mechanisms as described above, see EXAMPLE 5, very high dissolution rates are obtained. In this case the iron powder may be held in a confined part of the reservoir by a suitable member in the form of e.g. a separating screen. Generally, the cathodic/anodic surface rate should be chosen to be as large as possible for high dissolution rates.

We claim:

1. A method for electrochemically dissolving a first metal by simultaneously creating hydrogen evolution at a second metal, the second metal being a metal that has a larger current exchange density for hydrogen evolution than the first metal, both metals being immersed in an aqueous electrolyte system, wherein the first metal and the second metal are galvanically coupled, comprising applying for reducing the effect of or preventing under potential deposition of the first metal on the second metal in order to reduce inhibition of said hydrogen evolution at said second metal, at least one measure of the group of measures consisting of mechanical abrasion of the surface of the second metal, adding powder of a second metal to the aqueous electrolyte surrounding the second metal and agitating the aqueous electrolyte containing the powder, providing an electrical resistance which is selected such that the current flow through connecting means galvanically coupling the first and the second metal is substantially at the maximum value obtainable by varying the resistance periodically interrupting the electrical circuit comprising the connecting means, dividing the aqueous electrolyte into a first fluid for dissolving the first metal and a second fluid contacting the second metal said first and second fluids being coupled by a selectively permeable device hindering passage of ions of the first metal to the second fluid.

2. The method according to claim 1, wherein the first metal is substantially Zn or Sn.

3. The method according to claim 2, wherein the second metal is chosen from the group comprising Pt, Pd, Ir, Co, Ni, Fe and ferrous materials including steel.

4. The method according to claim 1, wherein the first metal is Zn.

5. The method according to claim 4, wherein the second metal is Fe or steel.

6. A method for treating Zn-containing steel scrap by electrochemically dezincing in an alkaline solution in a first process and reclaiming the zinc in a second process, wherein the dezincing in the first process takes place galvanically without external electrical power supply, according to the method of claim 4.

7. The method according to claim 1, wherein the first metal is Sn.

8. The method according to claim 7, wherein the second metal is Pt.

9. The method according to claim 1, wherein the aqueous electrolyte is one or more alkaline solution(s).

10. The method according to claim 9, wherein each said alkaline solution is a sodium hydroxide solution.

11. The method according to claim 10, wherein each alkaline solution is chosen to have a hydroxide concentration of more than 9M.

12. The method according to claim 9, wherein said at least one measure comprises that each alkaline solution is chosen to have a hydroxide concentration of more than 8M.

13. The method according to claim 9, wherein at least the alkaline solution contacting said second metal is held at a temperature of above 340 K.

14. The method according to claim 13, wherein the temperature of the alkaline solution is above 350 K.

15. The method according to claim 9, wherein the first metal is in the form of separate elements and the first and the second metal are coupled via a current collector contacting the first metal.

16. The method according to claim 15, wherein the current collector has an active surface of Mg.

17. The method according to claim 1, wherein said at least one measure comprises mechanical abrasion of the surface of the second metal.

18. The method according to claim 1, wherein said at least one measure comprises adding powder of a second metal to the aqueous electrolyte surrounding the second metal and agitating the aqueous electrolyte containing the powder.

19. The method according to claim 1, wherein said at least one measure comprises that the first and the second metal are galvanically coupled by connecting means, said connecting means providing an electrical resistance which is selected such that the current flow through said connecting means is substantially at the maximum value obtainable by varying the resistance.

20. The method according to claim 19, wherein the electrical circuit comprising the connecting means is periodically interrupted.

21. The method according to claim 1, wherein said at least one measure comprises to divide the aqueous electrolyte into a first fluid for dissolving the first metal and a second fluid contacting the second metal, said first and second fluids being coupled by a selectively permeable device hindering passage of ions of the first metal to the second fluid.

22. The method according to claim 21, wherein said first fluid is in a first process volume for electrochemically dissolving Zn or Sn and said second fluid is in a second process volume for hydrogen evolutions, with the first process volume and the second process volume coupled by said device hindering the passage of ions of the metal being dissolved, for galvanic dissolution of said Zn or Sn.

23. The method according to claim 1, wherein said first metal is in the form of a coating on a metal substrate, and said second metal is separate from said metal substrate.

24. The method according to claim 1, comprising removing by said electrochemical dissolution at least one member of the group consisting of Zn and Sn from metal scrap.

25. The method according to claim 24, comprising removing Zn from steel scrap.

26. The method according to claim 24, comprising removing Sn from steel scrap.

* * * * *